(12) United States Patent
Huang

(10) Patent No.: US 7,310,900 B2
(45) Date of Patent: Dec. 25, 2007

(54) LIQUID-FILLED DISPLAY DEVICE

(76) Inventor: Chih-Yuan Huang, 15F-3, No. 153, San-To 3rd Rd., Chien-Chen Dist., Kaohsiung City (TW)

( * ) Notice: Subject to any disclaimer, the term of this patent is extended or adjusted under 35 U.S.C. 154(b) by 384 days.

(21) Appl. No.: 10/985,283

(22) Filed: Nov. 11, 2004

(65) Prior Publication Data

US 2006/0096139 A1    May 11, 2006

(51) Int. Cl.
*G09F 19/00* (2006.01)
(52) U.S. Cl. ............................ 40/407; 40/406; 40/408; 40/409; 40/410; 40/412; 40/439; 40/442; 40/477; 446/267
(58) Field of Classification Search .................. 40/406, 40/407, 408, 409, 410; 446/267; 239/18, 239/211; 312/204
See application file for complete search history.

(56) References Cited

U.S. PATENT DOCUMENTS

| | | | | |
|---|---|---|---|---|
| 3,706,149 | A * | 12/1972 | Olivieri | 40/407 |
| 5,228,225 | A * | 7/1993 | Lee | 40/409 |
| 5,617,657 | A * | 4/1997 | Kahn | 40/406 |
| 6,187,394 | B1 * | 2/2001 | Johnson et al. | 428/13 |
| 6,447,137 | B1 * | 9/2002 | Long | 362/96 |
| 6,481,128 | B1 * | 11/2002 | Lin | 40/406 |
| 6,539,654 | B2 * | 4/2003 | Lin | 40/406 |
| 6,550,167 | B2 * | 4/2003 | Huang | 40/406 |
| 6,811,836 | B1 * | 11/2004 | Johnson et al. | 428/20 |

FOREIGN PATENT DOCUMENTS

WO      WO 9003636 A1 *   4/1990

* cited by examiner

*Primary Examiner*—Lesley D. Morris
*Assistant Examiner*—Marcus Menezes
(74) *Attorney, Agent, or Firm*—Christie, Parker & Hale, LLP

(57) ABSTRACT

A liquid-filled display device includes a hollow member mounted on a transparent top end wall of a hollow base and confining a water-tight inner space filled with a liquid body, and a display unit mounted on the top end wall and having a top wall and two transparent sidewalls connected to the hollow member. The sidewalls and the top wall cooperate with the hollow member and the top end wall to confine a display space. At least one of the sidewalls is provided with an advertisement. An air pump unit is mounted in the base, and is operable so as to supply fine air bubbles into the liquid body through a diffuser set mounted within the inner space. A lamp unit mounted in the base beneath the hollow member is operable so as to radiate colored light that penetrates through the top end wall into the inner space.

10 Claims, 8 Drawing Sheets

LIQUID-FILLED DISPLAY DEVICE

BACKGROUND OF THE INVENTION

1. Field of the Invention

The invention relates to a display device, more particularly to a liquid-filled display device that can provide lively visual effects to attract consumers' attention.

2. Description of the Related Art

Referring to FIG. 1, a conventional display stand 1 is shown to include a hollow base 11, an upright member 12 mounted on the base 11, and a plurality of shelves 13 that are mounted spacedly on the upright member 12 for displaying articles. The overall design of the conventional display stand 1 is, as shown, monotonous and uninteresting, and is therefore unable to attract consumer's attention.

Referring to FIG. 2, a conventional display shelf 2 is shown to include a lower cabinet 21, a rectangular transparent hollow upper post 22 projecting uprightly from the lower cabinet 21 and confining an enclosed inner space 222, and a plurality of spaced apart horizontally extending plates 23 projecting outwardly from the upper post 22 for placement of articles thereon. The post 22 is filled with a liquid body 20 in the inner space 222. A cover 223 is mounted releasably on a top end of the post 22, and has a plurality of vent holes 224 formed therein. A plurality of diffusers 225 are mounted on a bottom end of the post 22 within the inner space 222. The display shelf 2 further includes a pair of lamps 227 which are mounted under a bottom side of the post 22 externally of the inner space 222 and which are operable to emit colored light that passes through the liquid body 20. An air blower (not shown) is mounted in the cabinet 21 for supplying fine air bubbles into the liquid body 20 via the diffusers 225. Although the display shelf 2 is more attractive in design as compared to the conventional display stand 1 of FIG. 1, since the displayed articles are simply placed on the plates 23 without any protective cover, they are vulnerable to dust and damage, and even shoplifters. Hence, the display shelf 2 is not suitable for displaying relatively expensive and delicate items. Besides, frequent re-arrangement of the articles in a neat order may be necessary if the articles are open to consumers' inspection.

U.S. Pat. No. 6,550,167 discloses an advertisement stand. As shown in FIG. 3, the advertisement stand 8 includes a hollow base 83, and an upright transparent hollow member 84 mounted on the base 83 and confining an inner space filled with a liquid body 82. A cover 823 formed with a plurality of vent holes 822 is mounted removably on a top end of the hollow member 84. A diffuser set 824 is mounted on a bottom end of the hollow member 84 within the inner space. An air pump (not shown) is mounted in the base 83 and is operable to supply fine air bubbles into the liquid body 82 via the diffuser set 824. A lamp unit 825 is mounted in the hollow base 83 beneath the hollow member 84, and is operable so as to radiate colored light. Although the advertisement stand 8 provides lively visual effects to attract consumers' attention and can be adapted for placement of articles on the base 83, it also suffers from drawbacks similar to those of the aforementioned display shelf 2.

SUMMARY OF THE INVENTION

Therefore, the object of the present invention is to provide a liquid-filled display device that can create lively, colorful and dazzling visual effects to draw the attention of consumers, and that can protect articles displayed therein.

Accordingly, a liquid-filled display device of this invention includes a hollow base, an upright transparent hollow member, a display unit, a diffuser set, an air pump unit, and a lamp set. The base has a transparent top end wall. The hollow member is mounted on the top end wall of the base, and confines a water-tight inner space that is adapted to be filled with a liquid body. The display unit is mounted on the top end wall of the base, and has two transparent upright sidewalls connected to the hollow member, and a top wall. The sidewalls and the top wall cooperate with the hollow member and the top end wall of the base to confine a display space. At least one of the sidewalls is adapted to be provided with an advertisement thereon. The diffuser set is mounted on the top end wall of the base within the inner space. The air pump unit is mounted in the base, is connected to the diffuser set, and is operable so as to supply fine air bubbles into the liquid body in the inner space through the diffuser set. The lamp set includes a lamp unit mounted in the base and disposed beneath the hollow member. The lamp unit includes at least one lamp which is operable so as to radiate colored light that penetrates upwardly through the top end wall of the base into the inner space.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
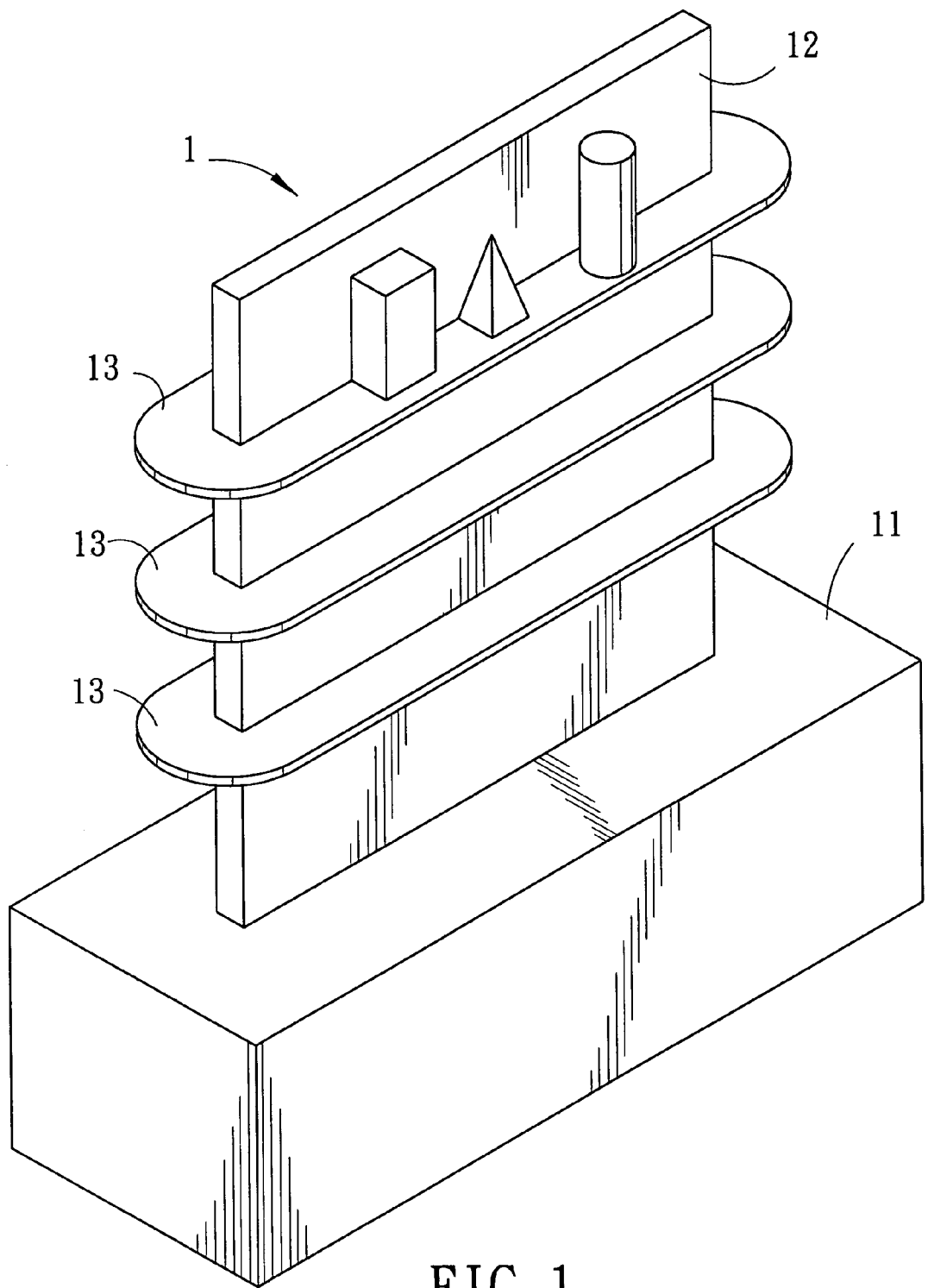
FIG. 1 is a perspective view of a conventional display stand.
Figure 2:
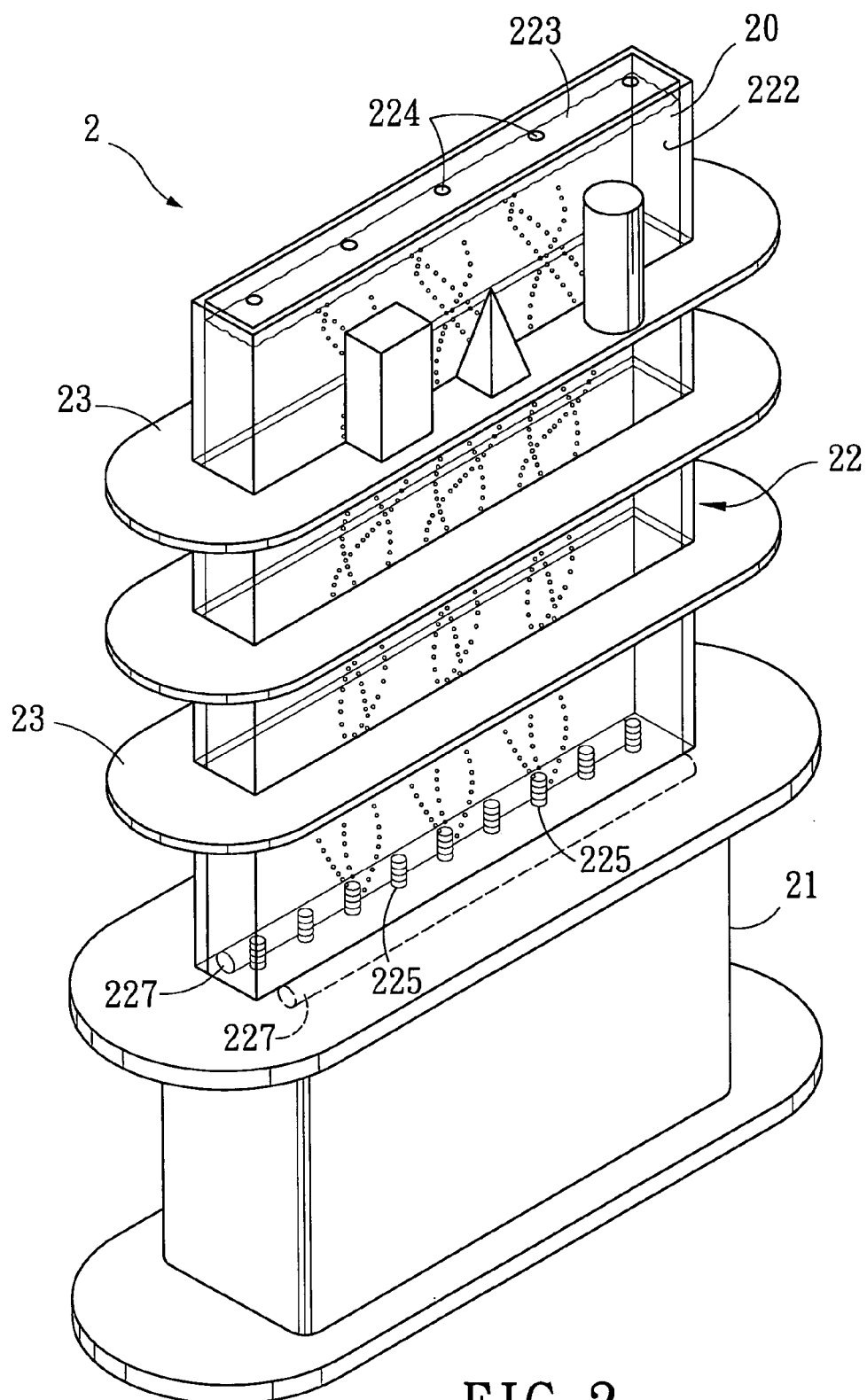
FIG. 2 is a perspective view of a conventional display shelf.
Figure 3:
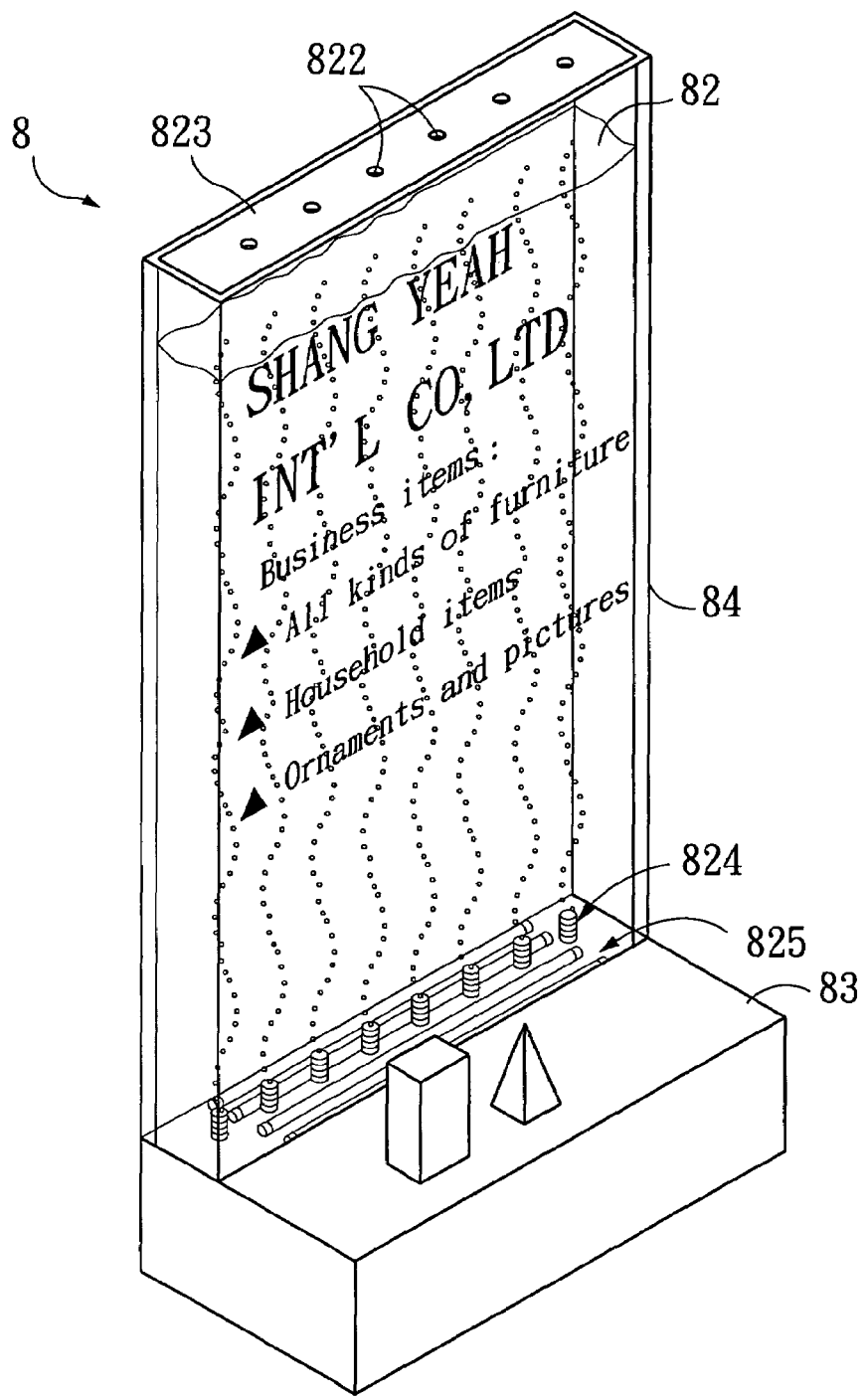
FIG. 3 is a perspective view of a conventional advertisement stand disclosed in U.S. Pat. No. 6,550,167.

Before the present invention is described in greater detail, it should be noted that like elements are denoted by the same reference numerals throughout the disclosure.

Figure 4:
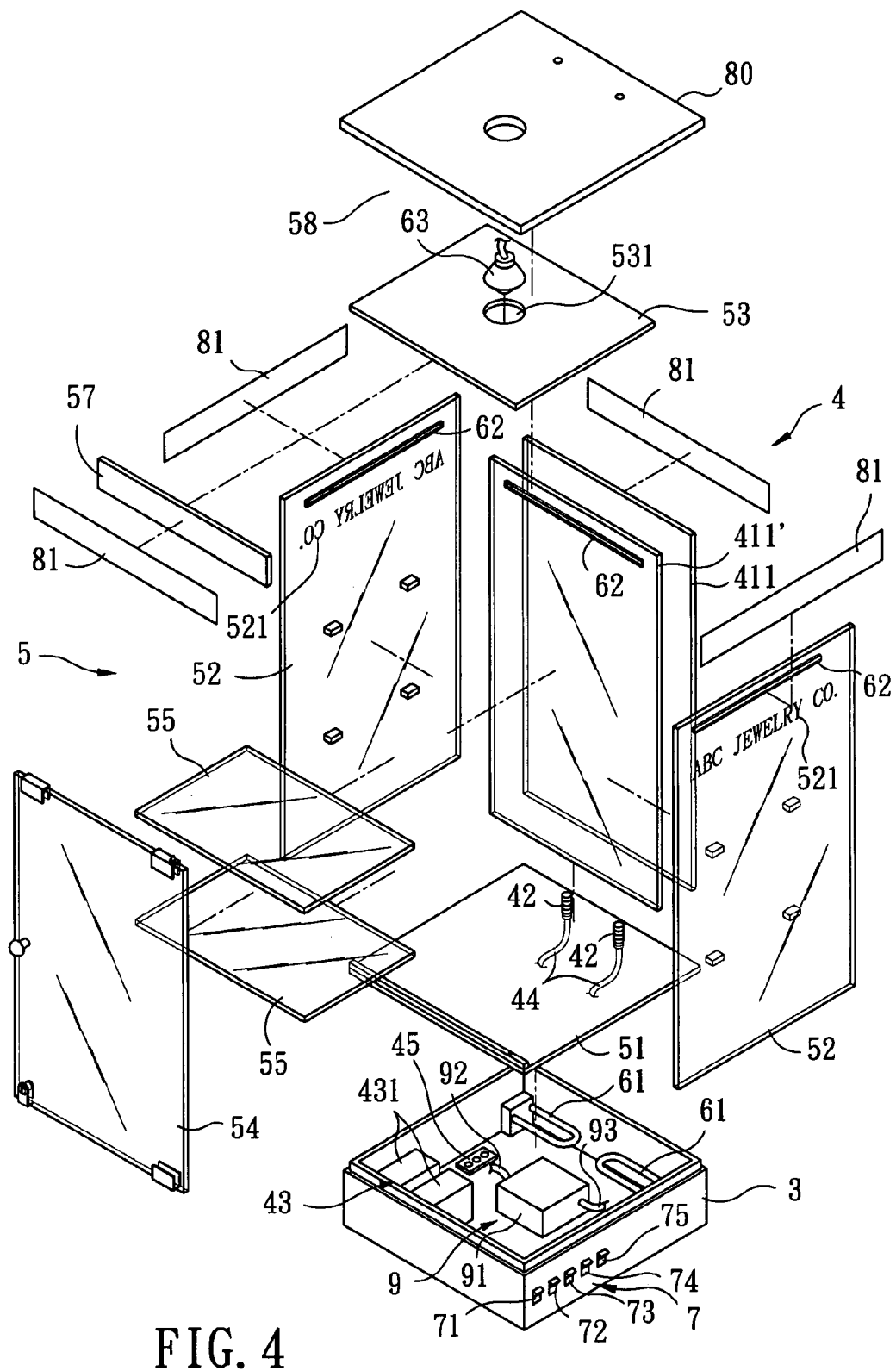
FIG. 4 is an exploded perspective view of the first preferred embodiment of a liquid-filled display device according to this invention.
Figure 5:
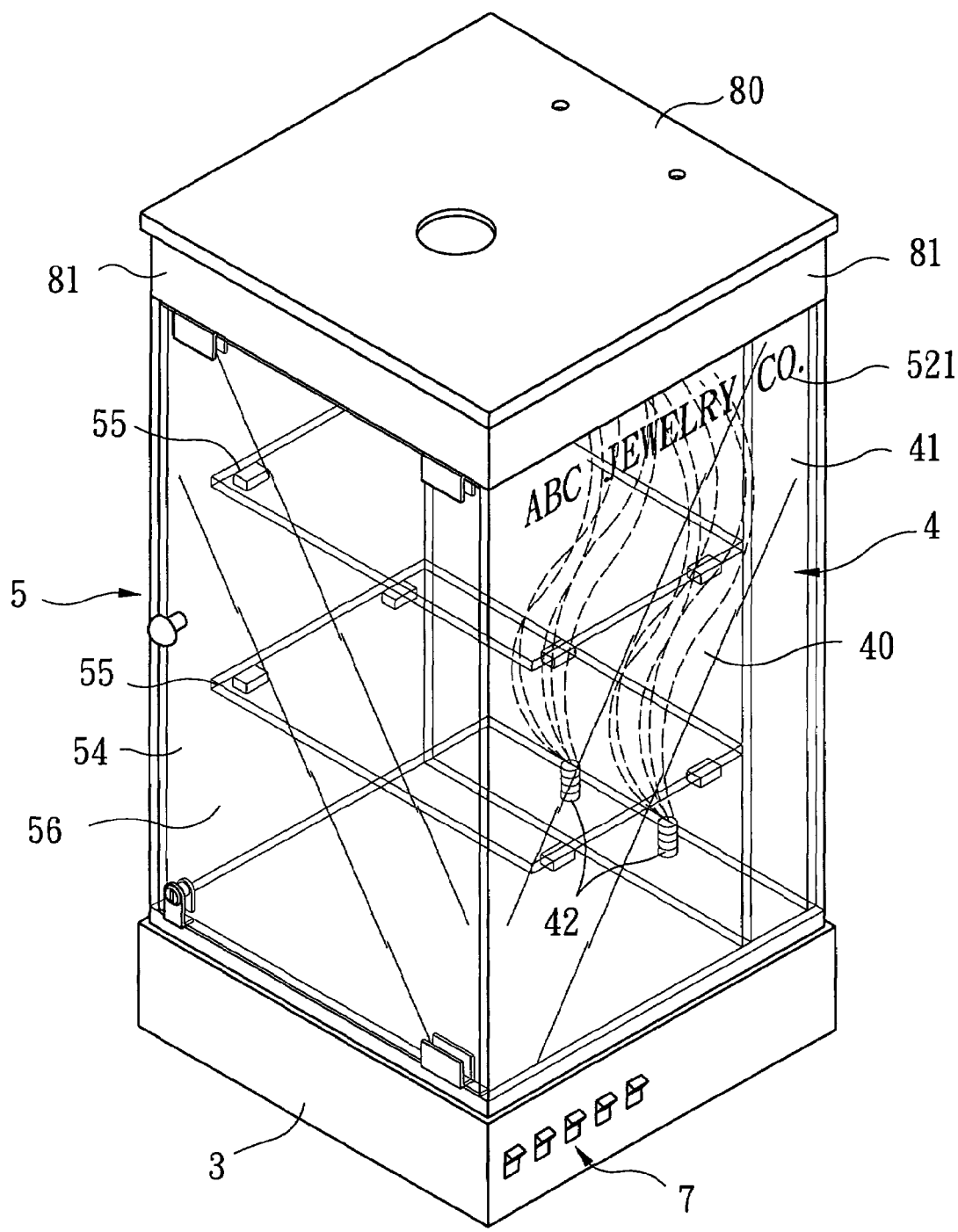
FIG. 5 is an assembled perspective view of the first preferred embodiment.

Referring to FIGS. 4 and 5, the first preferred embodiment of a liquid-filled display device according to this invention is shown to include a hollow base 3, an upright transparent hollow member 4, a display unit 5, a diffuser set, an air pump unit 43, and a lamp set.

The base 3 has a transparent top end wall 51 having opposite front and rear ends, and two opposite lateral ends.

The hollow member 4 is mounted on the top end wall 51 of the base 3, and confines a water-tight inner space 41 that is adapted to be filled with a liquid body 40.

The display unit 5 is mounted on the top end wall 51 of the base 3, and has two transparent upright sidewalls 52 connected to the hollow member 4 and respectively having bottom ends connected to the two lateral ends of the top end wall 51 of the base 3, and a top wall 53 connected to upper ends of the sidewalls 52. The sidewalls 52 and the top wall 53 cooperate with the hollow member 4 and the top end wall 51 of the base 3 to confine a display space 56. The display unit 5 further has a plurality of transparent shelves 55 mounted spacedly in the display space 56 between the sidewalls 52 for placement of articles (not shown) thereon, and a transparent door panel 54 pivoted respectively to the base 3 and the top wall 53 to control access into the display space 56 and to protect the articles displayed in the display space 56. Furthermore, each of the sidewalls 52 is adapted to be provided with an advertisement 521 (such as a brand name, logo or trademark) thereon that is formed by laser engraving.

In this embodiment, the hollow member 4 has an outer wall 411 which has a bottom end connected to the rear end of the top end wall 51 and two lateral edges connected respectively to inner surfaces of the two sidewalls 52 at rear end edges of the sidewalls 52, and an inner wall 411' which is spaced apart from the outer wall 411 and which has a bottom end connected to the top end wall 51 distal from the rear end of the top end wall 51 and two lateral edges connected respectively to the inner surfaces of the two sidewalls 52. The inner wall 411' cooperates with the top end wall 51 of the base 3, and the sidewalls 52 and the top wall 53 of the display unit 5 to confine the display space 56. The sidewalls 52 of the display unit 5 and the inner and outer walls 411', 411 of the hollow member 4 have upper ends extending upwardly beyond the top wall 53.

The display unit 5 further includes a front frame plate 57 which has a lower end mounted on a front end of the top wall 53, two lateral ends respectively connected to front ends of the sidewalls 52, and an upper end flush with the upper ends of the sidewalls 52 and the inner and outer walls 411', 411 of the hollow member 4, thereby confining a receiving space 58 among the inner wall 411', the front frame plate 57, the top wall 53, and the sidewalls 52. The display device further comprises a cover panel 80 mounted on the upper ends of the front frame plate 57, the sidewalls 52, and the inner and outer walls 411', 411 to close the receiving space 58. In addition, the cover panel 80 cooperates with the inner and outer walls 411', 411 of the hollow member 4, the sidewalls 52 of the display unit 5, and the top end wall 51 of the base 3 to confine the aforesaid water-tight inner space 41.

The display device of this invention further comprises four decor plates 81 that are respectively attached to outer surfaces of the front frame plate 57, the sidewalls 52, and the outer wall 411 between the cover panel 80 and the top wall 53 such that upper ends of the decor plates 81 are respectively flush with the upper ends of the front frame plate 57, the sidewalls 52, and the outer wall 411. The cover panel 80 is mounted on the upper ends of the front frame plate 57, the sidewalls 52, and the hollow member 4 and on the upper ends of the four decor plates 81.

The diffuser set is mounted on the top end wall 51 of the base 3 within the inner space 41, and includes two spaced-apart diffusers 42.

The air pump unit 43 is mounted in the base 3, and includes two air pumps 431 that are respectively connected to the diffusers 42 through ducts 44. The air pump unit 43 is operable so as to supply streams of fine air bubbles into the liquid body 40 in the inner space 41 through the diffusers 42.

A programmable controller 45 is provided to control activation and deactivation sequences of the air pump unit 43.

The lamp set includes first, second and third lamp units. The first lamp unit is mounted in the base 3 and is disposed beneath the hollow member 4. In this embodiment, the first lamp unit includes two first lamps 61, preferably colored fluorescent lamps, which are operable so as to radiate colored light that penetrates upwardly through the top end wall 51 of the base 3 into the inner space 41. The second lamp unit is mounted on the top wall 53, is disposed in the receiving space 58, and includes a lamp 63, preferably a spotlight, mounted in a hole 531 formed in the top wall 53 and operable so as to radiate light downwardly into the display space 56. In this embodiment, the third lamp unit includes three third lamps 62, preferably cold cathode lamps, which are mounted respectively on the inner surfaces of the sidewalls 52 and on a surface of the inner wall 411' of the hollow member 4 confronting the display space 56 and which are operable so to radiate colored light for illuminating the advertisements 521 on the sidewalls 52 and the display space 56. The lights radiated by the first and third lamp units are preferably different in color.

The display device further comprises a controller unit 7 mounted in the base 3. The controller unit 7 includes a first switch 71 operably coupled to the air pump unit 43 for controlling operation of the air pump unit 43, a second switch 72 operably coupled to the two first lamps 61, a third switch 73 operably coupled to the second lamp 63, and fourth switches 74, 75 operably coupled to the third lamps 62.

The display device further comprises filter means 9 for filtering the liquid body 40 in the inner space 41. The filter means 9 includes a filter 91 disposed in the base 3 to filter the liquid body 40, an intake tube 92 in fluid communication with the inner space 41 for introducing the liquid body 40 into the filter 91, and an outlet tube 93 in fluid communication with the inner space 41 for passage of the liquid body 40 into the inner space 41 after filtration.

With the aforesaid construction, the liquid-filled display device of this invention can provide the following advantages over the prior art:

1. Since the articles are displayed within the display space 56 that is closed by the door panel 54, they will not easily become dusty or damaged and cannot be accessed without permission.

2. The streams of air bubbles generated in the liquid body 40, combined with the different colored lights emitted by the first, second and third lamp units that illuminate the liquid body 40 in the inner space 41 and the display space 56, results in a dazzling and lively visual effect, which can not only capture consumers' attention instantly but also adds to the classiness of the articles displayed.

3. As the display device provides a protective closure for the displayed articles, it can be used to display relatively expensive and delicate items, such as jewelries and watches, and hence has a wider range of applications.

Figure 6:
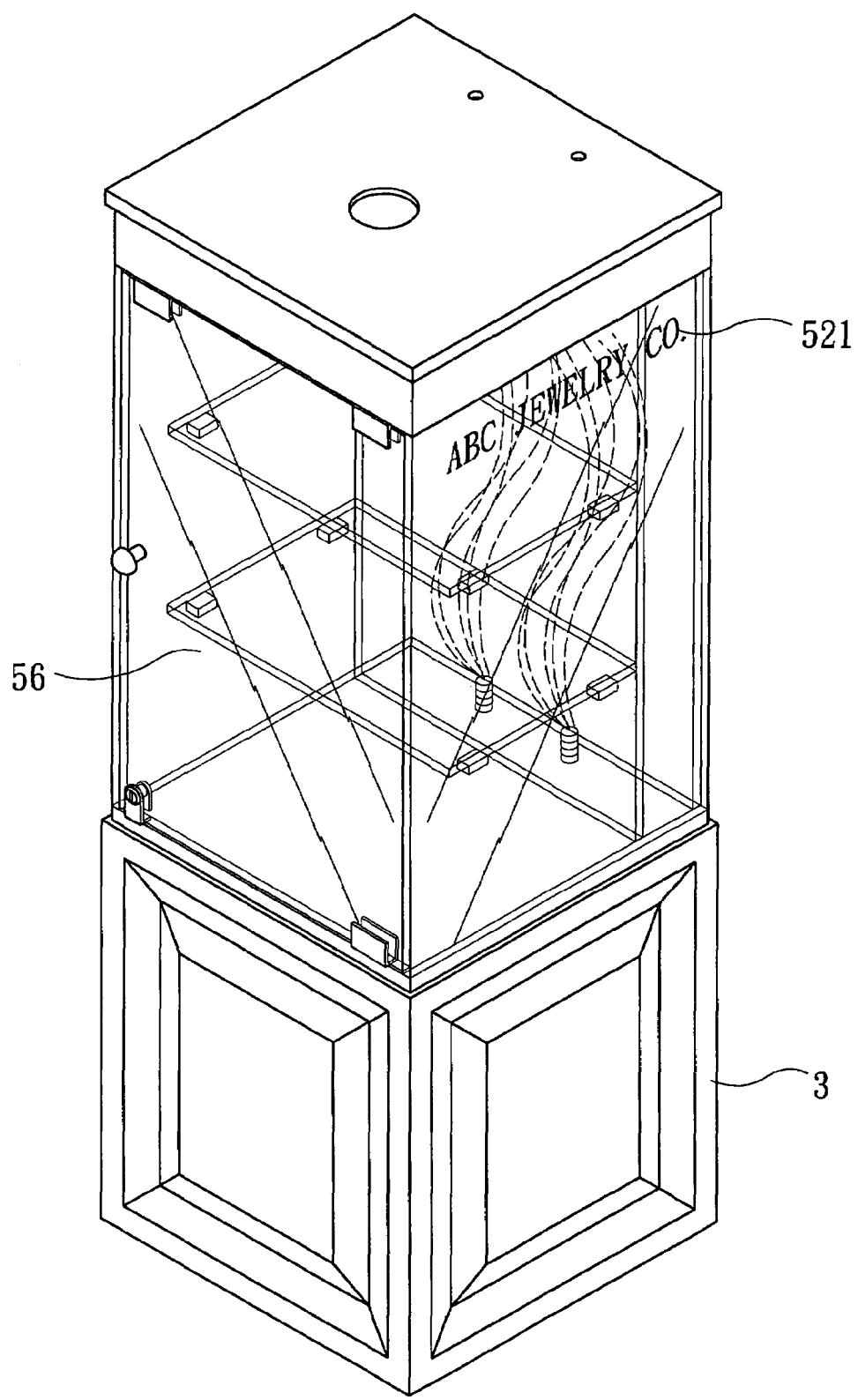
FIG. 6 is a perspective view of the second preferred embodiment of a liquid-filled display device according to this invention.

Referring to FIG. 6, the second preferred embodiment of a liquid-filled display device according to this invention is shown to be substantially the same as the first preferred embodiment, and differs therefrom mainly in that outer surfaces of the base 3 are provided with engraved patterns to enhance the appearance and elegance of the display device, and that the base 3 has a higher profile.

Figure 7:
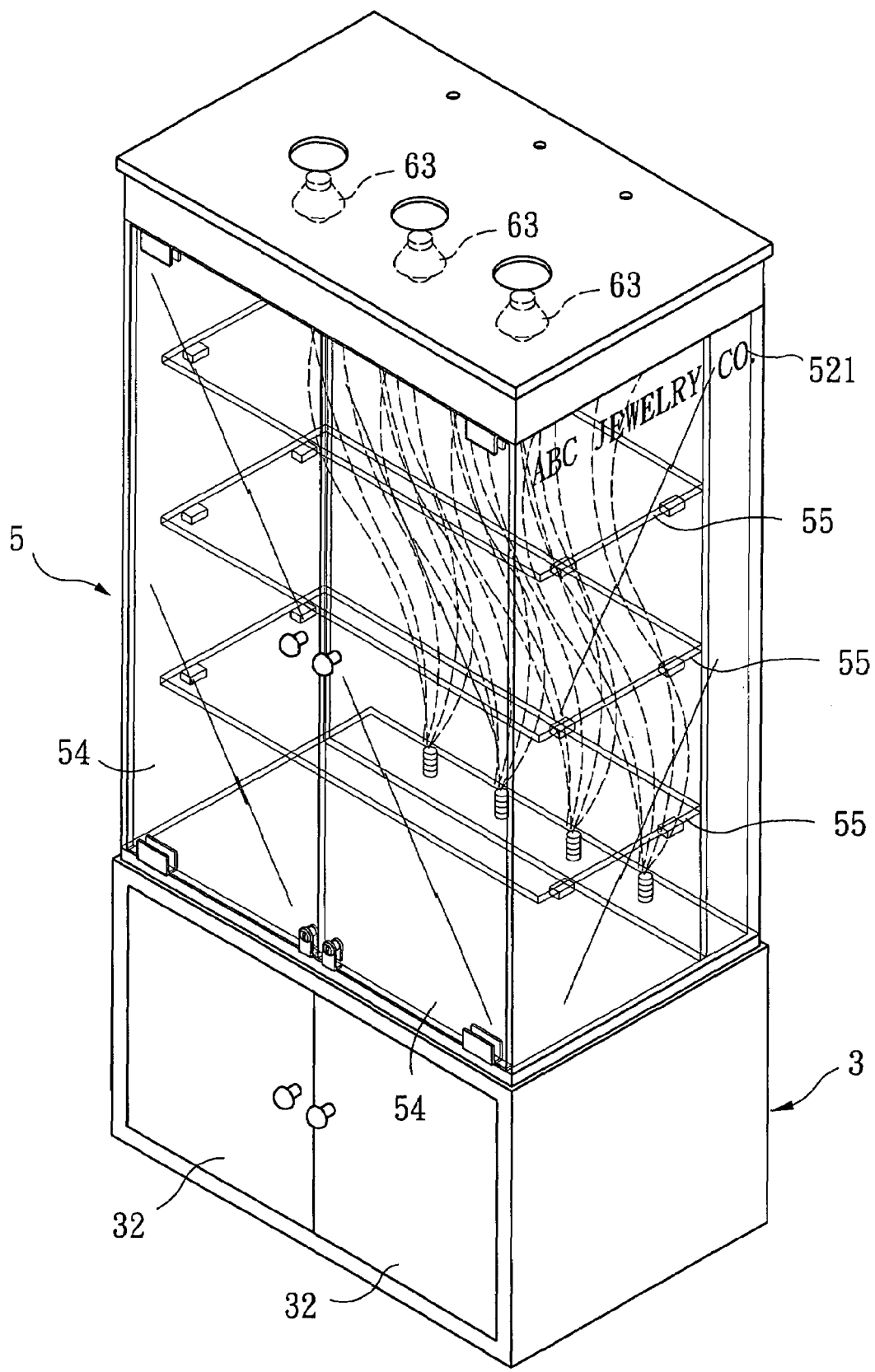
FIG. 7 is a perspective view of the third preferred embodiment of a liquid-filled display device according to this invention.

Referring to FIG. 7, the third preferred embodiment of a liquid-filled display device according to this invention is shown to be substantially the same as the first preferred embodiment, and differs therefrom mainly in that the base 3 is provided with two front door panels 32, and that the display unit 5 includes two transparent door panels 54, and three shelves 55. Besides, the second lamp unit includes three second lamps 63.

Figure 8:
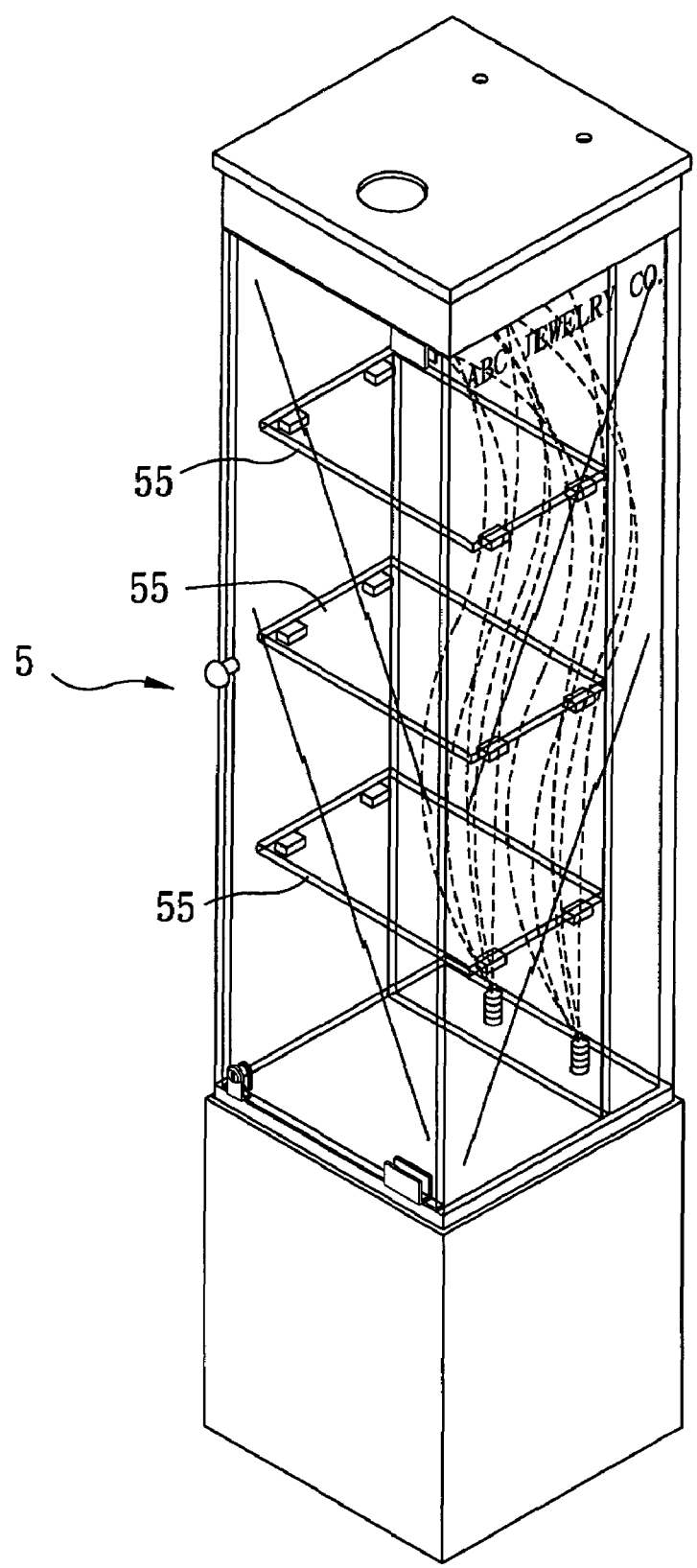
FIG. 8 is a perspective view of the fourth preferred embodiment of a liquid-filled display device according to this invention.

Referring to FIG. 8, the fourth preferred embodiment of a liquid-filled display device according to this invention differs from the first preferred embodiment in that the display unit 5 includes three shelves 55, and the display device as a whole has a higher profile.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A liquid-filled display device comprising:
    a hollow base having a transparent top end wall;
    an upright transparent hollow member mounted on said top end wall of said base, and confining a water-tight inner space that is adapted to be filled with a liquid body;
    a display unit mounted on said top end wall of said base, and having two transparent upright sidewalls connected to said hollow member, and a top wall, said sidewalls and said top wall cooperating with said hollow member and said top end wall of said base to confine a display space, at least one of said sidewalls being adapted to be provided with an advertisement thereon, said display unit further comprising a transparent door panel pivoted to said base and said top wall to control access into said display space;
    a diffuser set mounted on said top end wall of said base within said inner space;
    an air pump unit mounted in said base, connected to said diffuser set, and operable so as to supply fine air bubbles into the liquid body in said inner space through said diffuser set; and
    a lamp set including a first lamp unit mounted in said base and disposed beneath said hollow member, said first lamp unit including at least one first lamp which is operable so as to radiate colored light that penetrates upwardly through said top end wall of said base into said inner space.

2. The liquid-filled display device according to claim 1, wherein said display unit further has a plurality of transparent shelves mounted spacedly in said display space between said sidewalls.

3. The liquid-filled display device according to claim 1, wherein said sidewalls of said display unit and said hollow member have upper ends extending upwardly beyond said top wall, said display unit further having a front frame plate that has a lower end mounted on said top wall, two lateral ends respectively connected to said sidewalls, and an upper end flush with said upper ends of said sidewalls and said hollow member, thereby confining a receiving space among said front frame plate, said top wall, said sidewalls, and said hollow member, said display device further comprising a cover panel mounted on said upper ends of said front frame plate, said sidewalls, and said hollow member to close said receiving space.

4. The liquid-filled display device according to claim 3, further comprising four decor plates respectively attached to outer surfaces of said front frame plate, said sidewalls and said hollow member between said cover panel and said top wall such that upper ends of said decor plates are respectively flush with said upper ends of said front frame plate, said sidewalls, and said hollow member, said cover panel being mounted on said upper ends of said front frame plate, said sidewalls, and said hollow member and on said upper ends of said decor plates.

5. The liquid-filled display device according to claim 3, wherein said lamp set further includes a second lamp unit mounted on said top wall and disposed in said receiving space such that said second lamp unit is operable so as to radiate light downwardly into said display space.

6. The liquid-filled display device according to claim 5, wherein said lamp set further includes a third lamp unit having at least one third lamp mounted on a respective one of said sidewalls and said hollow member and operable so as to radiate colored light for illuminating said sidewalls and said display space.

7. The liquid-filled display device according to claim 6, further comprising a controller unit mounted in said base, said controller unit including a first switch operably coupled to said air pump unit for controlling operation of said air pump unit, a second switch operably coupled to said first lamp unit, a third switch operably coupled to said second lamp unit, and a fourth switch operably coupled to said third lamp unit.

8. The liquid-filled display device according to claim 3, wherein said hollow member includes inner and outer walls opposite to each other, said inner and outer walls cooperating with said top end wall of said base, said sidewalls of said display unit, and said cover panel to confine said inner space, said inner wall cooperating with said top end wall of said base, and said sidewalls and said top wall of said display unit to confine said display space.

9. The liquid-filled display device according to claim 1, further comprising filter means for filtering said liquid body in said inner space, said filter means including a filter disposed in said base to filter said liquid body, an intake tube in fluid communication with said inner space for introducing said liquid body into said filter, and an outlet tube in fluid communication with said inner space for passage of said liquid body into said inner space after filtration.

10. The liquid-filled display device according to claim 1, further comprising a programmable controller for controlling activation and deactivation sequences of said air pump unit.

* * * * *